Nov. 22, 1932.  D. L. SUMMEY  1,888,332
PRESSURE CONTROL SYSTEM
Original Filed March 12, 1926   6 Sheets-Sheet 4

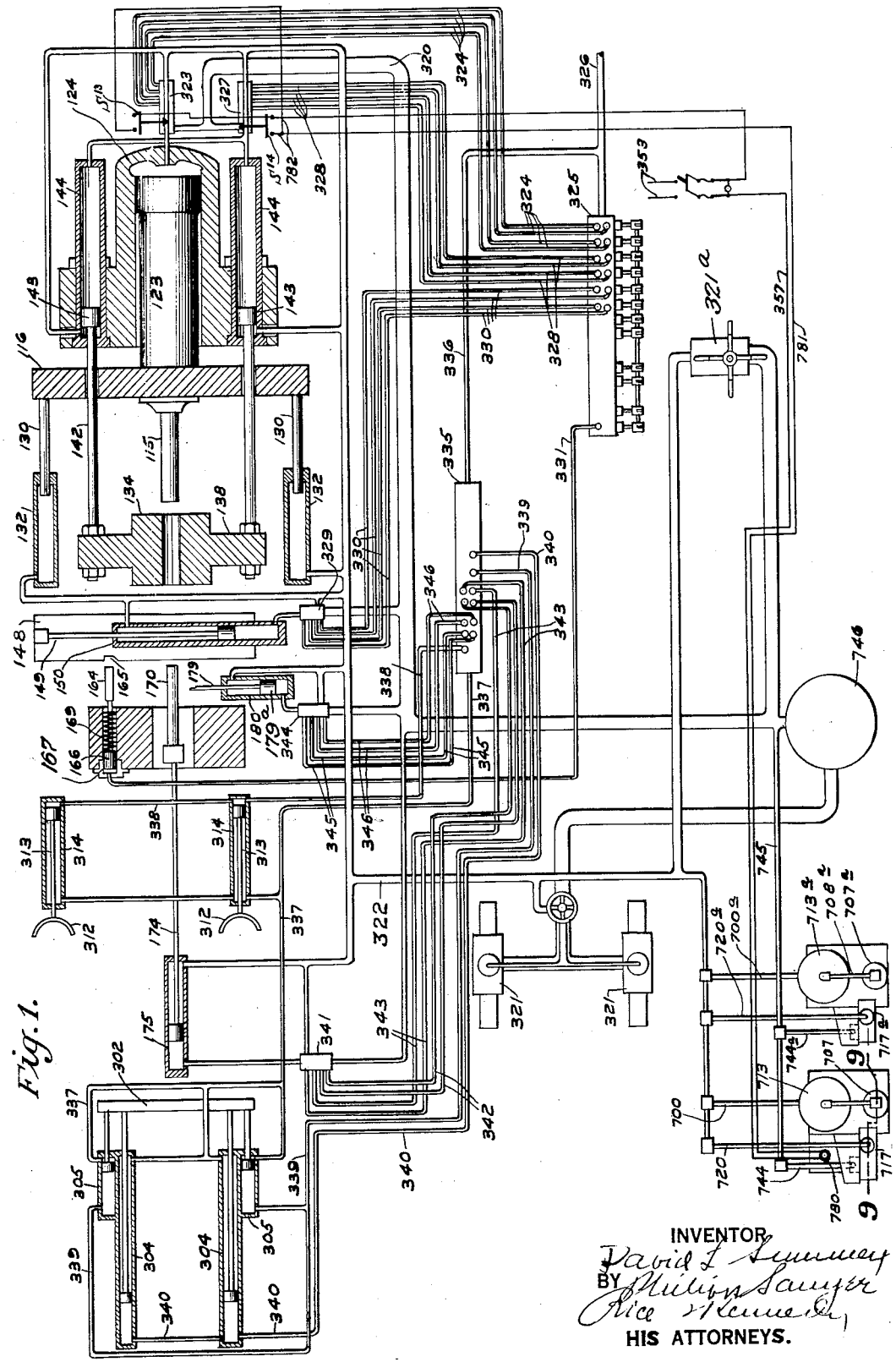

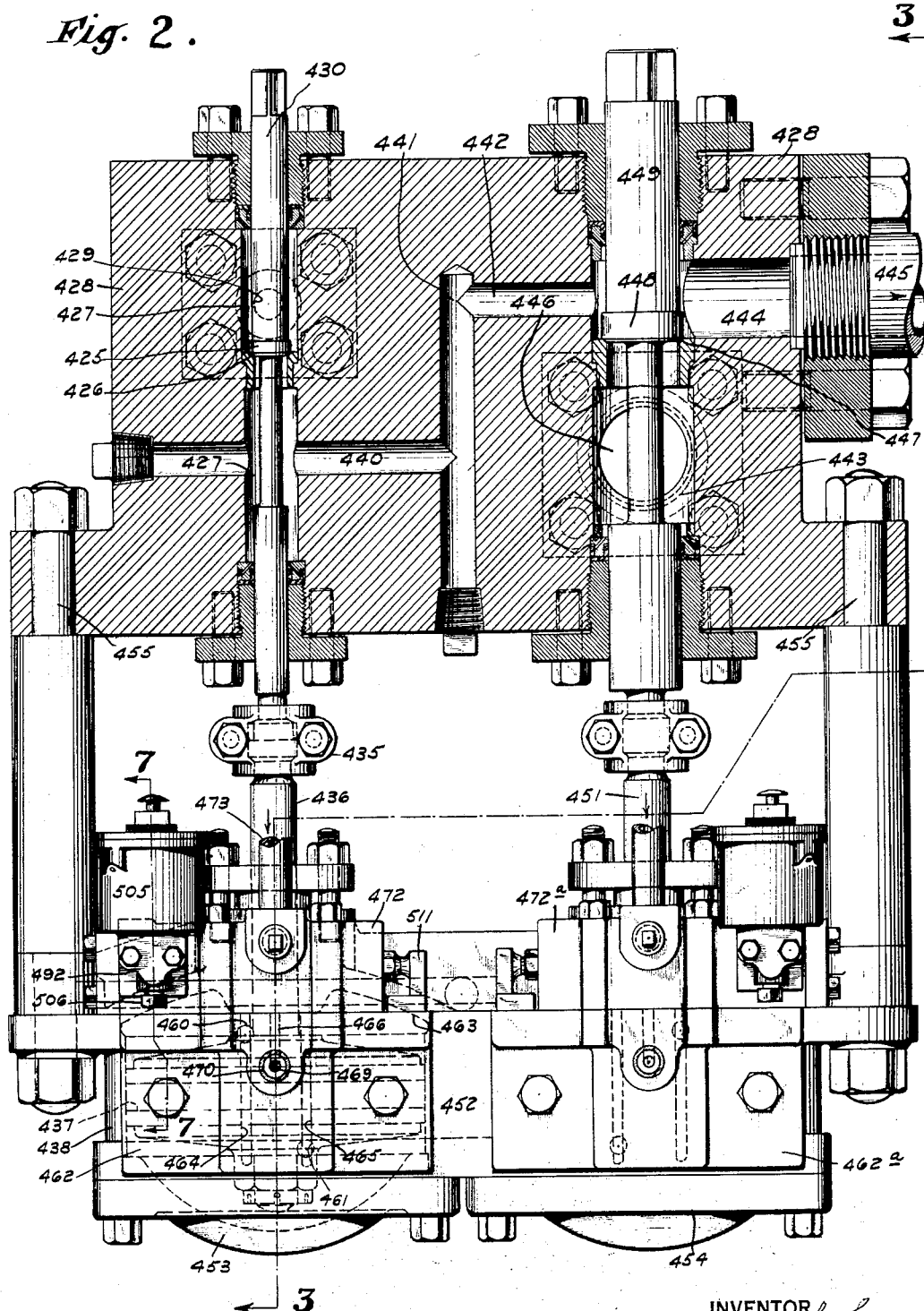

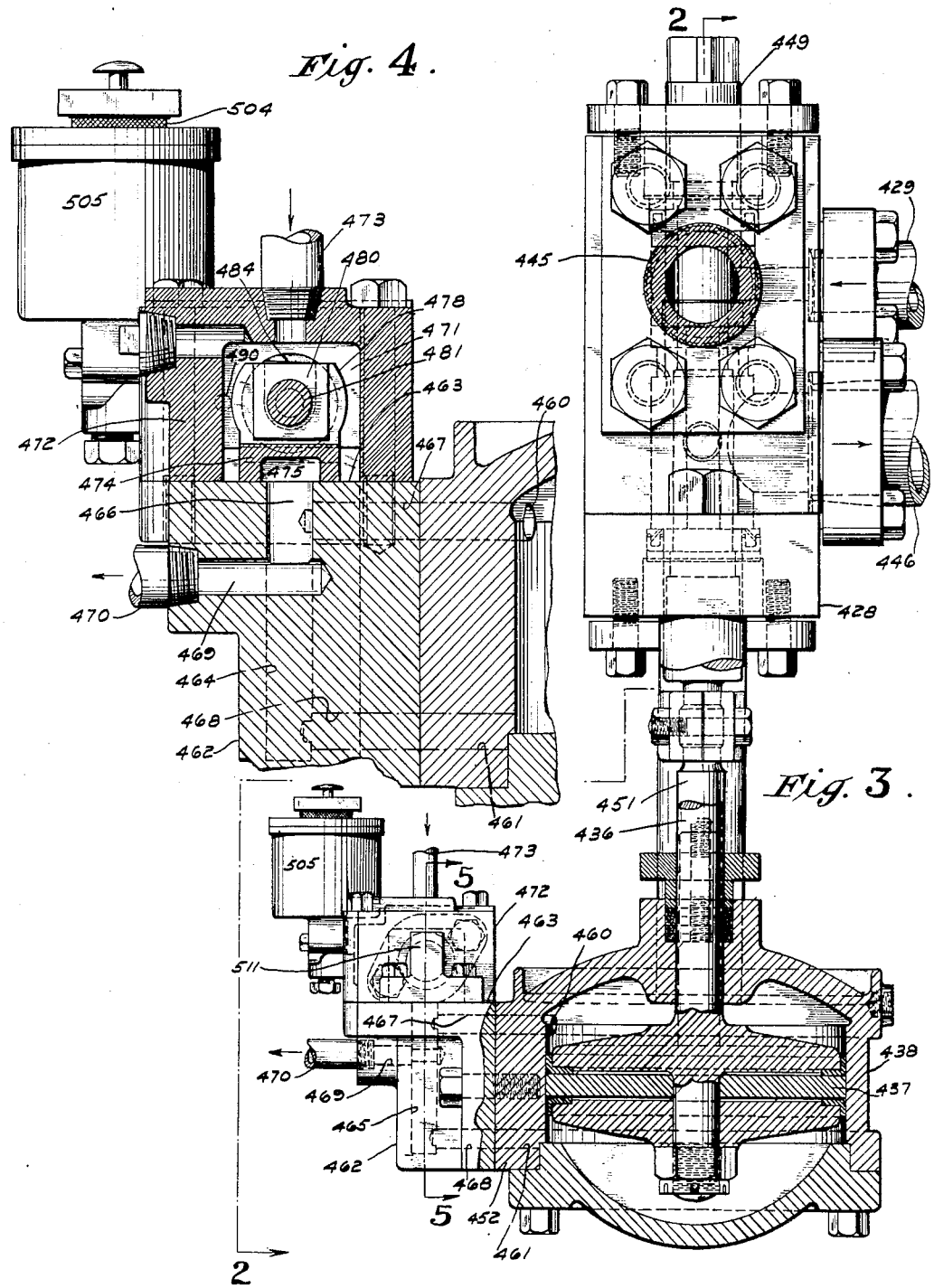

INVENTOR
David L. Summey
BY
HIS ATTORNEYS

Nov. 22, 1932.  D. L. SUMMEY  1,888,332
PRESSURE CONTROL SYSTEM
Original Filed March 12, 1926.  6 Sheets-Sheet 5

INVENTOR
David L. Summey
BY
His Attorneys

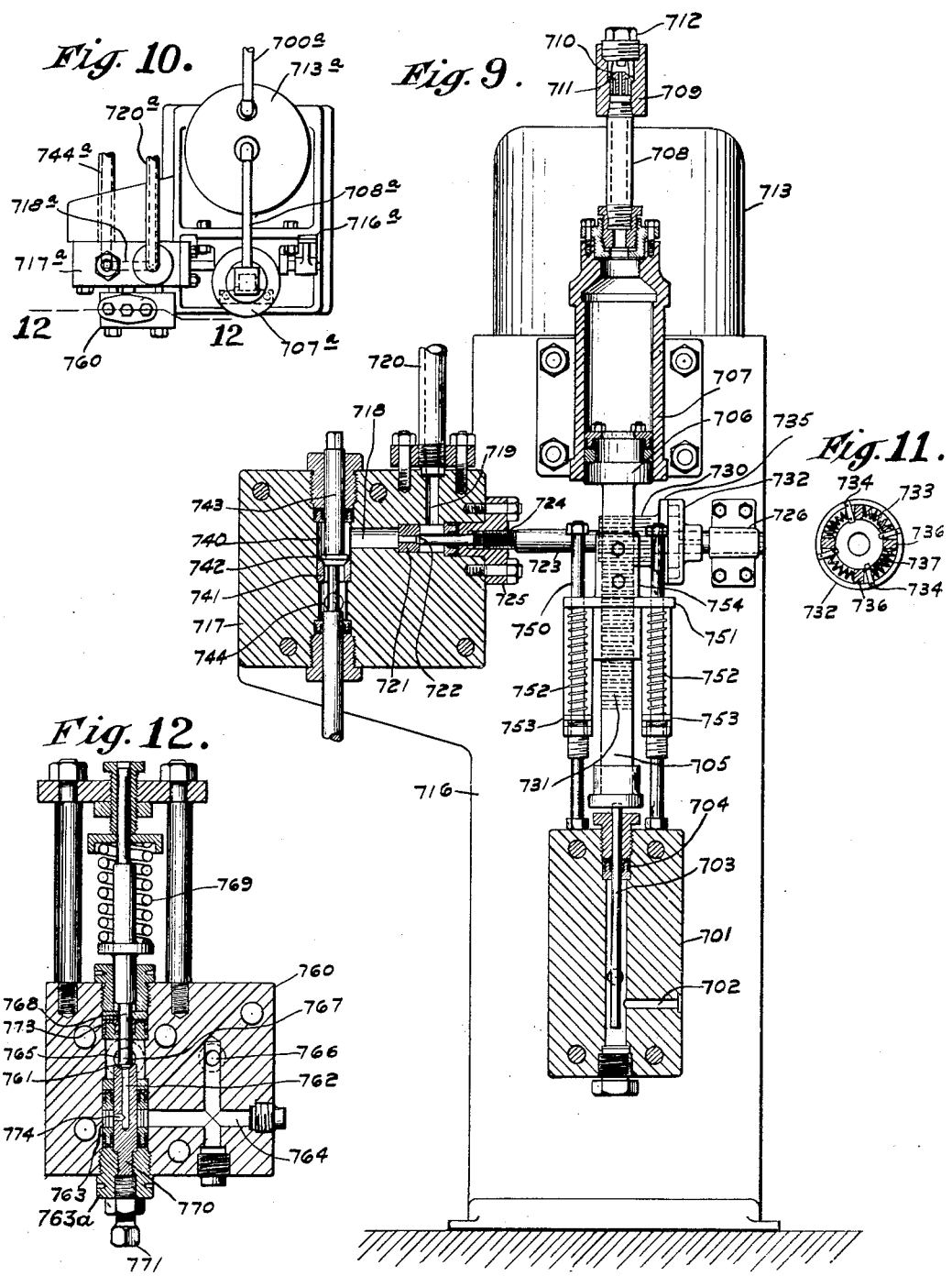

Patented Nov. 22, 1932

1,888,332

UNITED STATES PATENT OFFICE

DAVID L. SUMMEY, OF WATERBURY, CONNECTICUT

PRESSURE CONTROL SYSTEM

Original application filed March 12, 1926, Serial No. 94,334. Divided and this application filed September 21, 1928. Serial No. 307,542.

This invention relates to pressure control systems.

This application is a division from an application filed March 12, 1926, Serial No. 94,334, patented March 8, 1932, Patent Number 1,849,044.

It is an object of the invention to provide a fluid pressure control system in which the effective pressure may be automatically limited to one of a plurality of critical pressures.

With this general object, and others not specifically referred to, in view, the invention consists in the features, combinations, details of construction and arrangements of parts which will first be described in connection with the accompaying drawings and then more particularly pointed out.

In the drawings,

Figure 1 is a diagrammatic view of a fluid pressure system having embodied therein a pressure control constructed in accordance with the invention;

Figure 2 is a sectional view taken on the broken line 2—2 of Fig. 3, of a hydraulic valve unit;

Figure 3 is a sectional view taken on the broken line 3—3 of Fig. 2;

Figure 4 is a sectional view taken on the broken line 4—4 of Fig. 5;

Figure 9 is a view in vertical section, with parts in elevation, of part of a pressure limiting device, the section being taken on the line 9—9 of Fig. 1 (and enlarged);

Figure 10 is a top plan view of another part of the pressure limiting device;

Figure 11 is a sectional detail view; and

Figure 12 is a vertical sectional view (enlarged) taken on the line 12—12 of Fig. 10.

Figure 5:
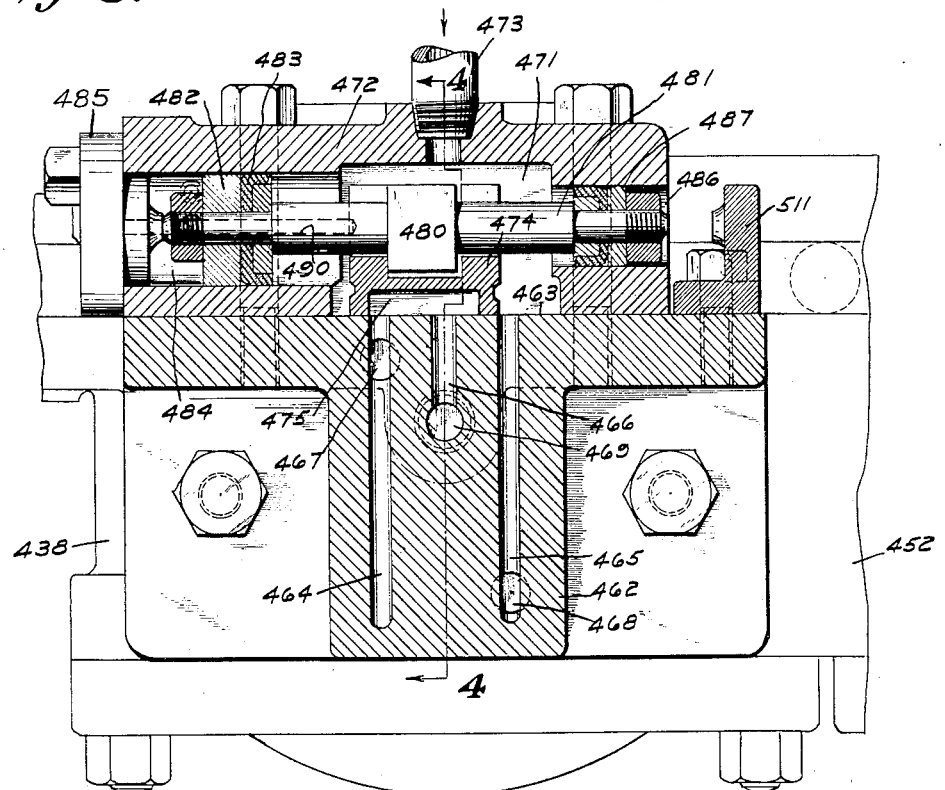
Figure 5 is a sectional view (enlarged), taken on the line 5—5 of Fig. 3.

Referring to the drawings, Fig. 1 illustrates diagrammatically a fluid pressure control as applied to the pressure system of an extrusion press. In this system certain press elements are actuated under relatively high pressure and other elements under relatively low pressure. As is more fully pointed out hereinafter, the invention in its entirety includes means for automatically limiting the effective pressure to one of a plurality of predetermined critical pressures.

The press here shown as an example has a ram 115 mounted on a cross-head 116 which slides on suitable horizontal columns or tie rods (not shown). Crosshead 116 is moved to drive the ram forward by a hydraulic plunger 123 which is secured to the crosshead. This plunger operates in a hydraulic cylinder 124 connected with the main pressure line, as later described. Crosshead 116 is withdrawn by means of two hydraulic plungers 130, which operate in relatively small pull-back cylinders 132 which are directly connected with the main line. Being under constant, that is, continuous pump pressure, their tendency is to move the crosshead back but because of their relatively small size they are effective only when the large cylinder 124 is under exhaust.

The billet to be extruded is held by a container 134 mounted on a crosshead 138 which slides on the tie rods above mentioned. Movement of the container crosshead 138 is effected by piston rods 142 to which the crosshead is connected and on which are pistons 143 operating in hydraulic cylinders 144. The crosshead 138 is moved in one direction, namely, towards the left, as viewed in Fig. 1, by variable, i. e., valve-controlled pressure fluid, as later described, and in the opposite direction by constant return pressure. As this constant return pressure operates on a smaller piston area it becomes effective only when the valve-controlled pressure is relieved.

Movable across the axis of the container chamber and ram is a reciprocating carrier slide 148 moved by a piston rod 149 to which it is secured and which has a piston operating in a hydraulic cylinder 150. This unit is operated in the same way as the container crosshead, namely, by variable pressure and constant return pressure.

This carrier slide, as explained in said parent application, carries the die. To stop the carrier in die-centering position, a latch 164 is provided which enters a notch 165 formed in the slide. The latch is attached to the end of a piston rod carried by the piston, 166 working in an air cylinder 167, the air supply of which is controlled as later referred to. The air pressure normally holds the latch advanced in a position to enter the notch. The latch is withdrawn by a coil spring 169 bearing against the face of the piston and effective upon release of the air pressure.

The billet is inserted into the container by a billet pusher 170. This pusher is carried on the end of a piston rod 174 having a piston working in a hydraulic cylinder 175 operated by variable pressure and constant return pressure.

To sever the extruded stock from the stump a cutter is provided in the form of drop bar shears 179. The cutter is connected to a piston 179ª working in a fluid pressure cylinder 180.

Figure 1 indicates a valve unit 323 for the hydraulic cylinder 124 of the main ram. Similar units are indicated at 327 for the container power unit, 329 for the slide power unit, 341 for the loading ram unit and 344 for the cutter unit. The drawings illustrate in detail an example of these units.

Referring more particularly to Figs. 2-8, the valve unit there shown includes a valve chest 428, having a valve chamber 427 with which communicates an inlet pipe 429 for connection with a water pressure line, e. g. line 322. The valve chest has a second valve chamber 443 communicating with an exhaust pipe 446 for connection with the waste water line, e. g. line 320, which may lead back to the suction side of the pumps, e. g. pumps 321. The inlet valve chamber 427 is connected with a pressure outlet pipe 445, leading to the power cylinder, by means of a transverse bore 440, a vertical bore 441, a second transverse bore 442, the exhaust chamber 443 and passage 444. The exhaust valve chamber is in communication with power outlet pipe 445 through passage 444. Above the exhaust outlet in the exhaust chamber is a tubular valve seat 447 on which seats an exhaust valve 448. The inlet valve is carried by a valve stem 430 which is connected by a coupling 435 with a piston rod 436, the piston 437 of which works in an operating air cylinder 438. The piston is operated by pressure fluid, e. g. compressed air, admitted to one end or the other of the cylinder. When the piston is raised it opens inlet valve 425 and when lowered it returns the valve to its seat. The exhaust valve is carried by a valve stem 449 and is connected by a coupling, like coupling 435, with a piston rod 451. This latter is a duplicate of piston rod 436 and is actuated by a duplicating air unit. These duplicating parts are not shown in detail but the construction will be apparent from Figs. 2 and 3. In the present embodiment, the two air cylinders are formed by a common cylinder block 452 with separate bottom closures 453, 454. The valve chest 428 and the common cylinder block 452 are connected together by bolts 455, the united structure being mounted in any suitable manner.

When the exhaust valve 448 is closed and the inlet valve 425 opens there is a flow of water from the main line through inlet pipe 429 to the power outlet pipe 445 and thence to the cylinder of the hydraulic power unit. When the inlet valve is closed and the exhaust valve open, the pressure water can exhaust back from the power unit through pipes 445 and 446 to the exhaust line.

Figures 2 to 8 inclusive illustrate an automatic control for a valve unit. As shown, the front side of the cylinder block 452 has a flat face (Fig. 3). The cylinder 438 for the inlet valve has an upper passage 460 leading from the flat face of the cylinder block to the interior of the cylinder above the piston, and a similar lower passage 461 leading to a point below the piston. Bolted to the flat face of the cylinder block is a block 462 having a flat top face 463. Opening out of this flat face (Figs. 5, 6) are three vertical bores or passages 464, 465, 466, two of which communicate with the air cylinder, the third being an exhaust passage. To this end, as here shown, the block 462 has an upper transverse passage or bore 467 leading from vertical bore 464 and registering with cylinder passage 460 and a lower transverse passage 468 leading from vertical bore 465 and registering with cylinder passage 461. The block has a third transverse bore or passage 469, extending in a direction opposite to bores 467, 468, and leading from the middle vertical passage 466 to an exhaust pipe or outlet 470. In the embodiment illustrated, a valve chamber 471 is formed by the flat face 463 of the block 462 and an open sided valve housing 472 bolted to the block 462. With this construction, the three vertical passages 464, 465, 466 open directly into the valve chamber. In the top of the valve housing 472 is an inlet pipe 473 for connection with a source of pressure fluid, e. g. compressed air. Operating in the valve chamber 471 and sliding on the top face of block 462 above the three ports of the vertical passage, is a D-slide valve 474, its enclosed recess 475 being arranged to span the port of the middle passage (exhaust) and one or the other of the end ports, depending on the valve position.

When the D-valve is in the position of Fig. 5, end passage 465 is open to the valve chamber, thus placing the lower end of inlet valve cylinder 438 in communication with the pressure fluid. The D-valve spans the middle passage 466 and end passage 464, thus placing the upper end of cylinder 438 in communication with exhaust. The air passes from valve chamber 471 through passages 465, 468 and 461 to the cylinder and raises piston 437, thereby opening the hydraulic inlet valve 425. Meanwhile air above the piston exhausts via passages 460, 467, 464, valve recess 475, passages 466, 469 and pipe 470.

When the D-valve is moved, as later described, to the position of Fig. 6, the flow is reversed. That is, passage 464 is open to the valve chamber and the air passes via passages 467 and 460 to the upper part of cylinder piston 437, thus closing inlet valve 425. Meanwhile the air below the cylinder exhaust via passages 461, 468, 465, valve recess 475, passages 466, 469 to pipe 470.

The D-valve 474 has two forked upright abutments 478, 479 between which is freely mounted a rectangular block 480 on a piston rod 481, the rod being cradled in the forks of the abutments. This forms a simple construction by which the D-valve is moved upon movement of the piston rod 481, the block 480 moving against one abutment or the other. It also permits the D-valve to adjust itself to its seat. On one end of the piston rod 481 is a relatively large piston 482 having a packing ring 483 and sliding in a cylindrical extension 484 of the valve chamber. The end of this extension is closed by a plug cap 485. At the other end of the valve chamber is a cylindrical extension 486 substantially smaller than extension 484 and open to atmosphere. In this extension 486 slides a relatively small piston 487 also mounted on the piston rod. This latter piston serves as a bearing support for the piston rod and a closure for the end of the valve chamber. The opposing inner faces of both pistons are under valve chamber pressure but the inner area of piston 482 is larger than that of piston 487. Under normal conditions, therefore, and assuming the end of extension 484 to be open to exhaust, there is a constant effective force, measured by the air pressure on the excess of one piston area over the other, that moves the piston rod in one direction, i. e. to the left as viewed in Figs. 5, 6. It may be moved in the opposite direction by admitting pressure to the outer end of extension 484. With the unbalanced position arrangement shown, air under substantially the same pressure as the valve chamber air may be used. When such pressure is admitted to extension 484, as presently described, the piston rod is moved in the opposite direction, i. e. to the right as viewed in Figs. 5, 6.

Opening out of the valve chamber 471 is a longitudinal passage 490 formed in the body of the casing 472 and communicating with a transverse bore or passage 491 which leads to the outer face of the casing. Bolted to this face of the casing is a valve casing 492 having a valve chamber 493 out of the lower end of which opens a transverse passage 494 registering with passage 491. Opening out of the upper end of valve chamber 493 is a second transverse passage 495 registering with a transverse passage 496 in casing 472 which leads to the outer end of extension 484 of the valve chamber 471, beyond the piston. Air from the valve chamber can, therefore, by-pass around piston 482 via passages 490, 491, 494, valve chamber 493, and passages 495, 496. The upper and lower portions of valve chamber 493 are separated by a conical valve seat 497 on which seats a conical control valve 498. When this valve is closed, the by-pass is shut off and the slide valve unit is under its normal effective pressure (Fig. 5). When, however, valve 498 is open, air by-passes from the valve chamber to the outer end of extension 484 to move the slide valve unit reversely (Fig. 6), as above described. To place extension 484 under exhaust, while valve 498 is closed, at the top of valve chamber 493 is an inverse conical valve seat 499 beyond which is a passage to atmosphere. On this valve seat seats an inverse conical valve 500. Both conical valves 498 and 500 are formed on a common valve stem 501 and are so arranged that when one valve is open the other is closed. Valve 500 is a vent valve controlling communication between the interior and exterior of valve casing 492. When valve 498 is open to by-pass actuating air, valve 500 is closed to seal the valve chamber 493. When control valve 498 is closed to shut off the by-pass, valve 500 is open, whereby air from the outer end of extension 484 exhausts via passages 496, 495 and valve chamber 493, as piston rod 481 moves under the force of normal pressure.

Figure 7:
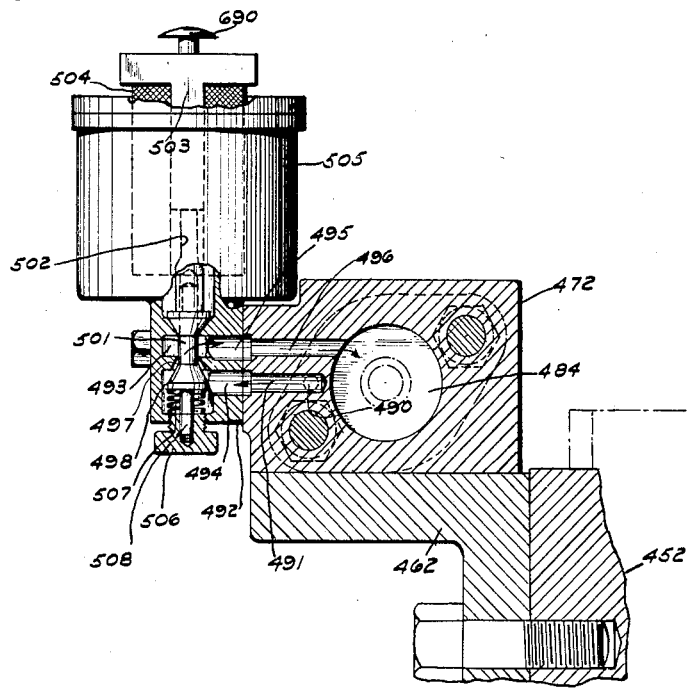
Figure 7 is a view partly in elevation and partly sectional (enlarged), the section being taken on the line 7—7 of Fig. 2.
Figure 8:
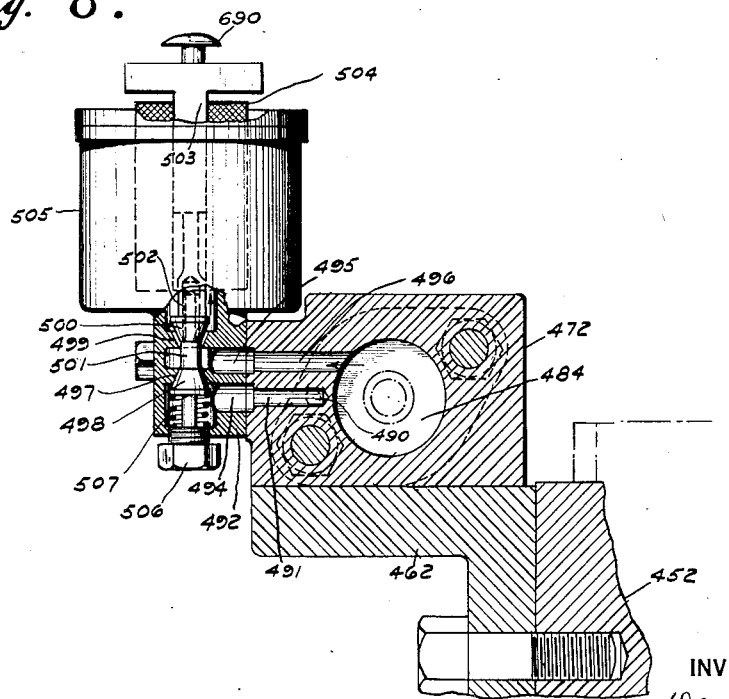
Figure 8 is a similar view showing parts in a different position.

To operate the by-pass control valve, as here shown as an example, the upper end of the valve stem 501 is connected by a coupling 502 with the core 503 of a solenoid. This solenoid has a winding 504 and a housing 505 and is of any suitable construction. Between the bottom of valve 498 and a plug nut 506 is a return spring 507. The valve unit has a guiding tail-piece 508 sliding in nut 506. When the solenoid is energized the resulting core movement forces down the common valve stem 501 and thereby closes vent valve 500 and opens by-pass valve 498. This position is shown in Fig. 7 and corresponds to Fig. 6 in which the D-valve is moved to the right by the by-passing air. When the solenoid is de-energized, return spring 507 serves to reverse the common valve stem 501, thereby closing the by-pass valve 498 and opening vent valve 500. This position is shown in Fig. 8 and corresponds to Fig. 5 in which the D-valve is moved to the left by the normal valve chamber pressure, the fluid previously by-passed exhausting as described.

Figure 6:
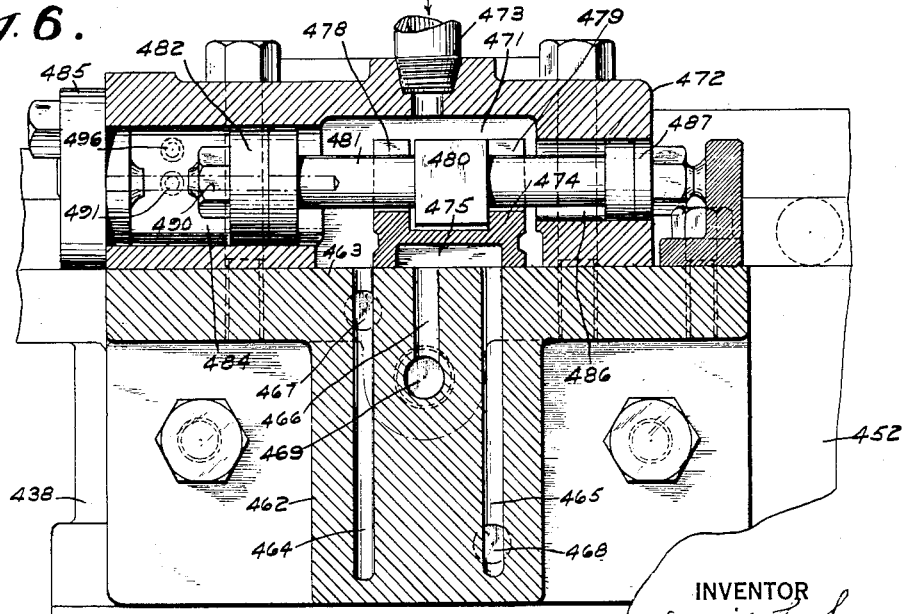
Figure 6 is a similar view showing parts in a different position.

As shown, the piston movement to the right, as viewed in Figs. 5, 6, is limited by a stop lug 511 for engagement by the end of the piston rod. At the other end the closure plug 485 serves as a stop for the other end of the piston rod to limit movement to the left. This stop construction avoids using the D-valve itself in stopping and so does not interfere with the adapting movement of the D-valve.

The construction described, including the D-valve, its operating pistons, its air-actuating system and the solenoid control valve, constitute one example of an air flow selective unit that may be termed a magnetic valve.

The above described features are those associated with the inlet valve of the hydraulic unit. A like control is associated with the exhaust valve and it is unnecessary to show or describe the same in detail. Fig. 2 shows a block 462a bolted to the common face of the cylinder casing 452 that is a reverse hand duplicate of block 462 and bears the same relation to the exhaust valve cylinder as block 462 does to the inlet valve cylinder. On the block 462a is a valve casing 472a that is a reverse hand duplicate of valve casing 472. It will be understood that this casing contains a D-valve, operating pistons and associated features that are reverse hand duplicates of those described. Fig. 2 also shows a solenoid unit duplicating that described, as will be apparent. That is, the two operating valve units have independently operating controls so that the inlet valve and exhaust valve may be operated independently. These magnetic valve units may be automatically operated as described, for example, in the parent application referred to.

In the embodiment illustrated in Fig. 1, the magnetic valves for hydraulic valve units 341, 344, are located at a central station 335. The operating cylinders of unit 341 are connected to this central station by pipes 342, 343, and those of unit 344 by pipes 345, 346. Such an arrangement is more fully described in said Patent No. 1,849,044.

Also in this embodiment the operating cylinders of unit 323 are connected by pipes 324 with a central station 325 having manually operated valves for controlling the air flow. Valve units 327 and 329 are similarly connected by pipes 328 and 330 respectively. Cylinder 167 is also connected to station 325 by pipe 331.

Central station 325 has an air pressure supply line 326, a branch 336 leading to station 335.

In some hydraulic systems it is desired to utilize relatively high pressure in certain steps and relatively low pressure in other steps. For example, in the apparatus above described, while the main ram and the container pull-back are operated on high pressure, e. g. 5000 pounds, it is desired to avoid this high pressure in the operation of the other hydraulic units such as the billet pusher and cutter and a relatively low pressure, e. g. 2000 pounds, is used. Means is provided, therefore, for limiting the main line pressure to a given low pressure, for example, by a low-pressure relief valve, and for electively rendering said relief valve ineffective so as to permit pressure to build up beyond such low limit. Constructions embodying the invention in its entirety will include means for also limiting the main line pressure to a given high pressure so that when the low-pressure relief is ineffective the high-pressure relief will control. This may be accomplished by two loaded relief valve units having different critical loads, the low pressure unit having in addition, an elective discharge valve between its relief valve and the discharge water line. When such elective valve is open the low pressure unit functions but when such valve is closed the low pressure unit is cut out because even though its relief valve opens as normally, the water is checked by the elective valve and consequently pressure can build up to the higher critical point to be controlled by the high pressure unit.

Although capable of various constructions, in that here shown as an example, and referring to Fig. 9, which shows the low pressure unit, a frame 716 carries a pressure cylinder 701 connected by an inlet 702 with the main pressure line of a hydraulic system, e. g. by branch pipe 700 of the main line of Fig. 1. In this cylinder is a plunger 703 working in a stuffing box 704. Plunger 703, as will be apparent, is forced upwardly by the main line pressure and a balancing load is provided to prevent such movement below a given critical pressure. While the loading means may vary, it may conveniently be accomplished by fluid pressure. As here shown as an example, plunger 703 at its upper and outer end takes into a socket formed in the bottom of a piston rod 705 on a piston 706 working in a loading cylinder 707. Cylinder 707 is connected by a pipe 708, through a valve chamber 709, with a tank 713 containing compressed air. To avoid undue leakage, the air pressure may operate through a column of water which fills cylinder 707, being acted upon by the air in the above mentioned receptacle. To this end, pipe 708 may lead almost to the bottom of the tank, the air driving the water up through the pipe into the loading cylinder. Valve casing 709 contains a skeleton valve 710 freely mounted in a conical valve seat 711 and limited in its upward movement by a plug nut 712. The valve is arranged to permit, when seated, a relatively slow flow of loading water into cylinder 707, but upon a reverse flow of loading water, out of cylinder 707, valve 710 lifts from its seat and permits a relatively rapid flow through an unrestricted passage.

It will be seen that the load opposed to movement of pressure plunger 703 is governed by the pressure of the loading air and the diameter of piston 706. By a proper combination of these two factors a balancing load for the desired critical pressure may be obtained. Assuming that in the control unit being described the critical pressure is 2000 pounds, until that limit is reached the balancing load holds down piston rod 705 which in turn holds down plunger 703 against the main line pressure. When, however, that limit is exceeded, plunger 703 is raised, forcing back piston 705 against the load and this movement is utilized to open a relief valve.. While the relieving means may vary, in structures embodying the invention to what is now considered the best advantage, the relief valve will be positively controlled in its movements. Although capable of various constructions, in the embodiment illustrated, carried by frame 716 is a valve block 717 having a horizontal bore 718 connected by a vertical bore 719 with a pipe 720 which, in turn, is connected into the main pressure line. Between the vertical passage 719 and the end of horizontal bore 718 is a tubular element 721 provided with a conical valve seat. Seating on this valve seat is a conical relief valve 722 formed on the end of a rotary valve rod 723. This valve rod has a screw-threaded portion 724 (left hand thread) working in an internally threaded stuffing box 725, and an end portion journalled in a bearing bracket 726. The valve is moved away from and toward its seat by rotation of its valve rod and this is effected, as shown, by movement of piston rod 705.

While the connection between the latter piston and the valve rod may vary, as here shown as an example, loosely mounted on the valve rod is a piston 730 which meshes with rack teeth 731 formed in the under side of piston rod 705. Keyed to valve rod 723 is a disk 732 having in its face an annular channel (Fig. 11), blocked at a number of spaced intervals, e. g. four intervals, by abutment blocks 734. The channeled face of this disk abuts a plate 735 formed on the end of pinion 730. This plate has four lugs 736 which project into channel 733. Between each lug and one of the abutment blocks 734 is a spring 737 housed by the channel. Assuming that the relief valve is open, when the pressure drops and piston rod 705 moves down under its load, pinion 730 is rotated, counter-clockwise as viewed in Fig. 9, looking toward the left, each lug 736 being pushed against its adjacent spring 737. This force is transmitted through the springs to blocks 734 to rotate disk 732 which, being keyed to the valve rod, rotates the latter. This rotation, through the left hand screw-thread, moves the relief valve into its seat. The teeth of pinion 730 are long enough to accommodate the endwise movement of the valve rod. The parts are so arranged that the valve is seated shortly before the piston rod 705 completes its down stroke. Thereafter, the final rotary movement of the pinion is taken up by the compression of springs 737 through the movement of lugs 736. As a result, the relief valve is not forced into its seat by the full load of the loading unit but is only under the force of compressed springs 737.

When critical pressure is exceeded and piston rod 705 moves up, the pinion is reversely rotated, i. e. clockwise as viewed in Fig. 9. The resulting movement of lugs 736 permits reexpansion of the springs 737, thus removing pressure from the seated valve. Continued movement of lugs 736 brings them into engagement with the immediately adjacent blocks 734 and thereafter disk 735 is reversely rotated by this engagement to rotate the valve rod and withdraw the relief valve from its seat.

The relief valve described is always controlled in its movement by its threaded connection so that chattering, such as is usually encountered in blow-off valves, is avoided and the valve is capable of relatively long life even under almost constant operation. The loading means described is such that there is relatively no inertia of mechanical parts to be overcome in relief movement.

Beyond the end of horizontal bore 718, valve block 717 has a vertically disposed valve chamber 740 containing a tubular element 741 providing a valve seat. Cooperating with this valve seat is a conical valve 742 carried on a valve stem 743 which extends down below the valve block. Valve 742 and its seat are located between the end of horizontal bore 718 and discharge pipe 744 which may conveniently lead to the suction side of the water pumps. In the present embodiment pipe 744 connects with a pipe 745 (Fig. 1) leading to a storage tank 746 connected with the suction side of pumps 321. Valve 742 may be termed an elective valve because by its position election is made between an active or inactive low pressure control. That is, if elective valve 742 is open, when relief valve 722 opens, water from main line connection 720 is by-passed through bores 719, 718, valve chamber 740, and discharge connection 744, back to the suction side of the pumps. But if elective valve 742 is closed, relief cannot take place even though relief valve 722 opens. Consequently, this low pressure unit is cut out and pressure builds up to the higher limit. The operation of valve 742 will be referred to hereinafter.

Since pressure cylinder 701 is under main line pressure, packing 704 exerts a considerable friction which tends to retard movement of the plunger 703. Ordinarily, therefore, the relief valve would not open at the true critical pressure because its movement would be opposed by both the balancing load and the friction referred to. There is provided means for counteracting this frictional drag on the valve-opening movement. Although capable of various constructions, as here shown as an example, sliding on rods 750 adjacent piston rod 705 is a crosshead 751. This cross-head bears against two coil springs 752, the lower ends of which bear against adjustably fixed abutments 753. Bearing against the top of the crosshead is a block 754 attached to piston rod 705. In the normal position of the parts, that is, with the relief valve closed and piston rod 705 down, springs 752 are compressed so that they tend, through the crosshead and block, to raise piston rod 705. The springs are so arranged that this tendency substantially counteracts frictional drag of packing 704. That is, relief movement of the parts is opposed by the load on piston 706 plus the frictional drag of packing 704. Balanced against this is the main line pressure plus the force of springs 752. Consequently, the valve opens at a point approximating true critical pressure.

When the critical pressure is exceeded and piston rod 705 moves upwardly, the springs expand. It will be apparent, therefore, that since they must be re-compressed upon the down movement of the piston rod, the parts cannot return to normal position upon a drop of pressure that is only slightly below critical pressure, because such reverse movement is opposed not only by the main line pressure but by the springs. As a result, the relief valve stays open until the main line pressure drops sufficiently to permit the balancing load to overcome the main line pressure and compress the springs. The point of this drop will be considerably removed from the critical pressure but it is noted that the system is not designed to maintain a constant pressure but merely to prevent excess pressure. This substantial drop does no harm for once the relief valve is closed, the main line pressure quickly builds up again.

The high pressure unit, in the present embodiment, is basically a duplication of the low pressure unit except that it lacks a valve corresponding to elective valve 742. Fig. 1 illustrates this high pressure unit. This view shows a tank 713a like tank 713 connected by a pipe 708a to a loading cylinder 707a which corresponds to cylinder 707 but is larger. As this unit is set for a higher critical pressure, e. g. 5000 pounds, the balancing load is correspondingly greater. This is conveniently accomplished by using the same loading air pressure and increasing the diameter of the loading piston sufficiently to give the desired balancing load value. Fig. 1 shows a valve block 717a corresponding to block 717 but in which the horizontal bore 718a (Fig. 10) corresponding to bore 718, leads directly to a discharge connection 744a corresponding to pipe 744 and connected to pipe 745. That is, there is no valve such as valve 742 between the relief valve and the discharge line. It is to be understood that this high pressure unit has a relief valve and operating connections that are duplicates of like parts in the low pressure unit. When elective valve 742 of the low pressure unit is closed to cut out that unit, an excess of main line pressure above the high limit causes the high pressure relief valve to open and pressure is relieved by by-passing water via pipe 720a, bore 718a and pipe 744a to the storage tank.

In the embodiment illustrated the high pressure unit has a supplemental feature lacking in the low pressure unit. In hydraulic systems, such as the extrusion press above described, there sometimes occurs a sudden building up of pressure considerably beyond the desired critical point. Since the relief valve mechanism described requires some little interval of time to function, there is provided a supplemental blow-off valve for preventing dangerous peak pressures. To this end, as here shown as an example (Fig. 12), bolted to valve block 117a of the high pressure unit is a supplemental valve block 760. This block has a valve chamber in which is located a bushing 763 having suitable openings for connection with a bore 764 formed in the valve block and communicating with an inlet passage 766. Beyond the end of bushing 763 is a discharge passage 765. Seated in the bushing is a tubular valve seat element 762 having a cross bore 774 connecting, through the bushing openings, with the inlet. The end of tubular element 762 is dished to form a conical valve seat for a conical blow-off valve 767. This valve is formed on the end of a valve stem 768 slidable in a packing 773 and spring-held to its seat by a loading spring 769. This spring is set for a load at least as high as the high critical pressure. The parts are so arranged that inlet 766 connects with the water passage of valve block 717a inside the relief valve and discharge bore 765 connects with such passage outside the relief valve. That is, the water passage through supplemental valve block 760 is a bypass around the relief valve of the high pressure unit. In case of sudden peak loads that might cause trouble before the main relief valve can open, valve 767 opens against its spring and allows passage of water around the main relief valve from pipe 720a to pipe 744a.

The tubular element 762 has a stem 770 threaded in an adapter 763d and having a lock screw 771 on its outer end. In case the valve seat in the end of element 762 should wear, compensation can be effected by manipulating stem 770 and lock screw 771 to move the seat element toward the valve. Moreover, by manipulation of adapter 763a valve 767 can be ground in position without being removed.

With the construction described, with the discharge passage between the valve seat and the packing 773 for the valve stem, the packing is not under main line pressure and consequently does not exert an undue frictional drag on the movements of the valve stem.

The invention in its entirety includes means for automatically changing from one control to the other. This may be accomplished by normally maintaining the system under low pressure control and, when high pressure is required, automatically causing the low pressure control to be rendered ineffective. For example, in control systems such as that above described, the elective valve 742 may be kept open normally so that the low pressure unit normally controls and, upon requirements for high pressure, causing closing of such valve to cut out the low pressure control.

While the valve-operating means may vary, it may conveniently be accomplished by connecting valve stem 743 with the piston rod of an air-operated piston and controlling the air flow by a magnetic valve such as described. That is, valve 742 and its operating parts may be considered as the equivalent of either half of a hydraulic unit such as that described, e. g. the inlet valve half of the unit shown in Fig. 2. The operating parts are not shown in Fig. 9 but the construction will be apparent upon assuming valve stem 743 to correspond to valve stem 430 of Fig. 2. Associated with the air cylinder, corresponding to cylinder 438, is a magnetic valve unit duplicating that shown and described in connection with the inlet valve of Figs. 2, 5 and 6.

While the control may vary, as here shown as an example, the solenoid core 780 of the magnetic valve for the elective valve 742 is connected in a loop 357, 781 in a D. C. line 353. In this line is a normally open switch S13 arranged to be closed when the inlet valve of hydraulic unit 323 opens. This may be accomplished by a suitable actuating arm (not shown) mounted on the protruding end of the inlet valve stem of unit 323. Under what may be termed normal conditions, i. e. while the main ram is not under variable pressure and its inlet valve is closed, switch S13 is open, the solenoid of magnetic valve 780 is de-energized, its D-valve (in the position of Fig. 5) admits air to the bottom of the air cylinder for valve stem 743 and elective valve 742 is open. Consequently, the low pressure control unit is active and the main line pressure is limited to the low figure, e. g. 2000 pounds, for the operation of such units as the billet pusher, slide and cutter. When, however, the main ram is to be advanced, the demand for high pressure is put into effect by the opening of the inlet valve of hydraulic unit 323, and the opening movement of this valve closes switch S13. As a result, the solenoid of magnetic valve 780 is energized, its D-valve is reversed (to the position of Fig. 6), air is admitted to the top of the air cylinder for valve stem 743, and valve 742 is closed. Consequently, the low pressure control is rendered inactive and the main line pressure builds up to the high figure, e. g. 5000 pounds. This condition exists as long as the inlet valve of hydraulic unit remains open. When it closes, switch S13 opens again and the parts return to original position.

In the present embodiment, high pressure is desired also in pulling back the container to eject the sprue. The container moves back, it will be recalled, under return pressure when the exhaust valve of its hydraulic unit 327 opens. The valve rod of this exhaust valve has a switch-operating arm, like the arm for switch S13, and arranged to close a normally open switch S14 when such exhaust valve opens. This switch S14 is connected in a shunt 782 on loop 357, 781. Closing of this switch by the opening of the exhaust valve unit 327 results, as did closing of switch S13, in closing valve 742 and in rendering the low pressure control inactive. That is, when either of switches S13, S14 is closed the system is under high pressure control but when both are open it is under low pressure control. It will be apparent that various other circuit arrangements for the control of valve 742 are possible. The pressure may be controlled manually by a by-pass valve 321a between the pressure line and the exhaust.

The operation of the apparatus will be clear from the above without further description.

What I claim is:

1. In a combination with the main pressure line of a fluid pressure system and means for building up pressure therein, a plurality of power units operated by said pressure, valve means for connecting and disconnecting the respective power units with the line, a plurality of control units for limiting the fluid pressure to different predetermined levels, selective means for selecting the particular control unit to be effective, and means automatically operated in timed relation with one of said valve means for operating said selective means.

2. In combination with the main pressure line of a fluid pressure system and means for building up pressure therein, a low-pressure control unit having a relief valve capacitated to open upon a given main line pressure being exceeded, a high-pressure control unit having a relief valve capacitated to open upon a higher main line pressure being exceeded, an elective valve for cutting off relief in the low-pressure unit even when said low-pressure relief valve is open, whereby the low-pressure control unit is rendered ineffective, a plurality of power units for operation by said fluid pressure, valve means for connecting and disconnecting the respective power units with the line, and means automatically operated by the operation of one of said valve means for operating said selective valve.

3. In combination with the main pressure line of a fluid pressure system and means for building up pressure therein, a low-pressure control unit having a relief valve capacitated to open upon a given main line pressure being exceeded, a high-pressure control unit having a relief valve capacitated to open upon a higher main line pressure being exceeded, and an elective valve for cutting off relief in the low-pressure unit even when said low-pressure relief valve is open, whereby the low pressure control unit is rendered ineffective.

4. In combination with the main line of a fluid pressure system and means for building up pressure therein, two power units connected in said system for operation by the fluid pressure, controlling means for said power units, a low-pressure control unit having a relief valve capacitated to open upon a given main line pressure being exceeded, a high-pressure control unit having a relief valve capacitated to open upon a higher main line pressure being exceeded, and means for automatically causing the low-pressure control unit to be rendered ineffective upon operation of the controlling means for one of said power units.

5. In combination with the main line of a fluid pressure system and means for building up pressure therein, two power units connected in said main line, controlling means for said power units, a low-pressure control unit having a relief passage connected in said main line, a relief valve in said passage capacitated to open upon a given main line pressure being exceeded, supplemental elective valve in said relief passage, means including an electrically controlled element for holding said supplemental valve open, and means operated upon the operation of the controlling means for one of said power units for changing the circuit condition of said electrically controlled element to cause the supplemental valve to be closed, and a high-pressure control unit having a relief valve capacitated to open upon a higher pressure being exceeded.

6. In combination with the main line of a fluid pressure system and means for building up pressure therein, a pressure control unit having a relief passage connected to said main line, a normally closed relief valve in said passage, a rotary valve rod for said relief valve, said valve rod having a threaded portion in screw-threaded engagement with a relatively stationary part, and means dependent on a given main line pressure being exceeded for rotating said valve rod to open said valve.

7. In combination with the main line of a fluid pressure system and means for building up pressure therein, a pressure control unit having a relief passage connected in said main line, a normally closed relief valve in said passage, a cylinder open to main line pressure, a reciprocating unit including a plunger in said cylinder, means for effecting a counterbalancing load for said reciprocating unit, an operating connection between said reciprocating unit and said relief valve, a packing for said plunger, and spring-means normally tending to move the reciprocating unit in a direction to open the relief valve, thereby to counteract the frictional drag of said packing.

8. In combination with the main line of a fluid pressure system and means for building up pressure therein, a pressure control unit having a relief passage connected in said main line, a normally closed relief valve in said passage, a cylinder open to main line pressure, a reciprocating unit including a plunger in said cylinder and a piston rod and piston, means for exerting fluid pressure on said piston to counterbalance the main line pressure up to a given value, and an operating connection between said reciprocating unit and said relief valve.

9. In combination with the main line of a fluid pressure system and means for building up pressure therein, a pressure control unit having a relief passage connected in said main line, a normally closed relief valve in said passage, a cylinder open to main line pressure, a reciprocating unit including a plunger in said cylinder, means for effecting a counterbalancing load on said reciprocating unit, and an operating connection, including a spring, between said reciprocating unit and said valve.

10. In combination with the main line of a fluid pressure system and means for building up pressure therein, a pressure control unit having a relief passage connected in said main line, a normally closed relief valve in said passage, a rotary screw-threaded controlled valve rod for said relief valve, means for causing rotation of said valve rod to open said valve upon a given main line pressure being exceeded, a supplemental valve block having a supplemental relief passage by-passing around said relief valve, a normally closed supplemental relief valve in said supplemental passage and spring-loading means for permitting opening of said supplemental relief valve at a predetermined main line pressure at least as high as said given pressure.

11. In combination with the main line of a fluid pressure system and means for building up pressure therein, a valve block having a passage connected in said main line, a tubular element having its interior forming part of said passage, its inner end constituting a valve seat, a spring-loaded valve seating thereon, a threaded stem on said tubular member in threaded engagement with a stationary part, and a head on the stem outside of the valve block by which the stem and its tubular member may be manipulated.

12. In combination with the main pressure line of a fluid pressure system and means for building up pressure therein, a pressure cylinder connected with said pressure line, a plunger operating therein, a loading piston, a piston rod thereon opposed to said plunger, a relief valve, an operating connection between said relief valve and said piston rod, a loading cylinder for said piston, a tank for pressure fluid, a connection between said tank and said loading cylinder, and a throttle valve in said connection arranged to permit relatively unrestricted flow out of said loading cylinder and relatively restricted flow into the same, whereby the loading flow is throttled and the relief flow is free.

13. In combination with the main line of a fluid pressure system and means for building up pressure therein, two cylinders open to main line pressure, plungers in said cylinders, two relief passages for the pressure line, relief valves in said passages, a connection between each plunger and a relief valve for operating the valves, loading means for each of the operating connections comprising a piston and a common source of pressure fluid, said pistons being of different diameter whereby the load valves are different, and supplemental means for closing the relief passage of the low load unit to render said relief passage ineffective even with the relief valve open.

14. In combination with the pressure line of a fluid pressure system and means for building up pressure therein, a relief passage for said pressure line, a valve for said passage, loading means including a reciprocating element, means for causing the loading means to take a predetermined position, a connection including a yieldable element between the loading means and the valve for closing the valve, and means for opening the valve upon a given line pressure being exceeded.

15. In combination with the main pressure line of a fluid pressure system and means for building up pressure therein, a power unit connected in said system for operation by fluid pressure, a pressure control unit cooperating therewith and having a relief valve capacitated to open upon a given main line pressure being exceeded, and an elective valve for cutting off relief in said control unit even when said relief valve is open, whereby the control unit is rendered ineffective.

16. In combination with the main pressure line of a fluid pressure system and means for building up pressure therein, two power units connected in said system for operation by the fluid pressure at different times and at different pressures, controlling means for said power units, a pressure control unit having a relief valve capacitated to open on a given main line pressure being exceeded, and means for automatically causing said control unit to be rendered ineffective upon operation of the controlling means for one of said power units.

17. In combination with the main pressure line of a fluid pressure system and means for building up pressure therein, two power units connected in said system for operation by the fluid pressure, controlling means for said power units, a pressure control unit having a relief valve capacitated to open on a given main line pressure being exceeded, an elective valve for cutting off relief in said control unit even when said relief valve is open, and means for automatically operating said elective valve upon operation of the controlling means for one of said units.

18. In combination with the main line of a fluid pressure system and means for building up pressure therein, two power units connected in said main line, controlling means for said power units, a low-pressure control unit having a relief passage connected in said main line, a relief valve in said passage capacitated to open upon a given main line pressure being exceeded, a supplemental elective valve in said relief passage, means including an electrically controlled element for holding said supplemental valve open, and means operated upon the operation of the controlling means for one of said power units for changing the circuit condition of said electrically controlled element to cause the supplemental valve to be closed, thereby to render said low-pressure control unit ineffective even when said relief valve is open.

19. In combination with the main pressure line of a fluid pressure system and means for building up pressure therein, two power units connected in said system for operation by fluid pressure at different times and at different pressures, fluid inlet and exhaust valves for said power units, a pressure control unit having a relief valve capacitated to open upon a given main line pressure being exceeded, an elective valve for cutting off relief in said control unit even when said relief valve is open, and means whereby said elective valve is closed to cut off such relief when the inlet valve of one of said units is open, and opened to permit such relief when said inlet valve is closed.

In testimony whereof, I have hereunto set my hand.

DAVID L. SUMMEY.